United States Patent [19]

Yuasa

[11] Patent Number: 5,302,031
[45] Date of Patent: Apr. 12, 1994

[54] STUD TYPE TRACK ROLLER ROLLING BEARING

[75] Inventor: Kohei Yuasa, Gifu, Japan

[73] Assignee: Nippon Thompson Co., Ltd., Tokyo, Japan

[21] Appl. No.: 933,271

[22] Filed: Aug. 18, 1992

[30] Foreign Application Priority Data

Aug. 19, 1991 [JP] Japan .................. 3-230954

[51] Int. Cl.$^5$ .................................. F16C 19/38
[52] U.S. Cl. .................... 384/449; 384/58; 384/571
[58] Field of Search .............. 384/449, 58, 571, 50, 384/48, 569

[56] References Cited

U.S. PATENT DOCUMENTS

| | | | |
|---|---|---|---|
| 4,384,387 | 5/1983 | Pachuta | 384/449 |
| 4,522,515 | 6/1985 | Miki et al. | 384/571 |
| 4,798,149 | 1/1989 | Hoffmann | 384/58 |
| 5,232,289 | 8/1993 | Ito | 384/449 |

*Primary Examiner*—Lenard A. Footland
*Attorney, Agent, or Firm*—Skjerven, Morrill, MacPherson, Franklin, and Friel

[57] ABSTRACT

A stud type track roller bearing includes a stud having an inner ring portion, a threaded portion and an intermediate portion therebetween. A flange formed with an inclined surface is provided at an end of the inner ring portion. An intermediate ring formed with a pair of oppositely inclined surfaces is fitted onto the inner ring portion in abutment with the flange and a side ring formed with an inclined surface is also fitted onto the inner ring portion in abutment with the intermediate ring so that a pair of inner guide grooves is provided on the stud. An outer ring formed with a pair of outer guide grooves is fitted onto the inner ring portion with a gap therebetween to define a pair of annular guide channels which are spaced apart from each other axially and provided with a plurality of rollers.

8 Claims, 2 Drawing Sheets 5,302,031

STUD TYPE TRACK ROLLER ROLLING BEARING

BACKGROUND OF THE INVENTION

1. Field of the Invention

This invention generally relates to a stud type track roller bearing for use in various linear motion mechanisms and cam mechanisms in industrial robots, machining tools, and office automation machines and in particular to a stud type track roller bearing having a double roller channel structure.

2. Description of the Prior Art

A stud type track roller bearing is well known in the art and its typical structure is illustrated in FIG. 3. As shown, it includes a stud A including a head portion B which is somewhat larger in diameter an which defines an inner ring portion. An outer ring C is fitted onto the inner ring portion B with a predetermined gap therebetween to define an annular roller channel in which a plurality of cylindrical rollers D are arranged to provide a rolling contact between the inner ring portion B and the outer ring C. This structure is effective in sustaining a radial load, but it is not suitable for sustaining other loads such as axial and moment loads.

SUMMARY OF THE INVENTION

In accordance with the present invention, there is provided a stud type track roller bearing comprising: a stud generally elongated in shape and having an inner ring portion at one end portion thereof; defining means fixedly mounted on said stud located at said inner ring portion for defining a pair of circumferential inner guide grooves spaced apart from each other in a direction parallel to a longitudinal axis of said stud; an outer ring formed with a pair of circumferential outer guide grooves spaced apart from each other at an inner peripheral surface thereof and fitted onto said stud such that each of said circumferential outer guide grooves is aligned with a corresponding one of said circumferential inner guide grooves to thereby define a pair of annular guide channels; and a plurality of rollers provided in each of said pair of annular guide channels.

Preferably, each of said circumferential inner guide grooves includes an inner rolling surface along which said rollers roll which is inclined with respect to the longitudinal axis of said stud and each of said circumferential outer guide grooves also includes an outer rolling surface opposite to said inner rolling surface. Preferably, the rolling surfaces of each pair of inner and outer guide grooves are inclined in opposite directions with respect to the longitudinal axis of the stud.

In the preferred embodiment, the defining means includes a flange formed at an outer end of said inner ring portion, an intermediate ring fitted onto said inner ring potion in contact with said flange and a side ring fitted onto said inner ring portion in contact with said intermediate ring. In one embodiment, the intermediate ring has an outer peripheral surface formed with a pair of oppositely inclined inner rolling surfaces. In another embodiment, the flange and the side ring each has an outer peripheral surface each formed with an oppositely inclined inner rolling surface. Preferably, the stud is formed with a passage leading at least to an opening provided at a location of a peripheral surface of the inner ring portion where said side ring is to be located.

It is therefore a primary object of the present invention to provide an improved stud type track roller bearing capable of effectively sustaining loads applied in directions other than the radial direction.

Another object of the present invention is to provide an improved stud type track roller bearing suitable for sustaining axial and moment loads.

A further object of the present invention is to provide an improved stud type track roller bearing high in load bearing capability.

A still further object of the present invention is to provide an improved stud type tack roller bearing simple in structure and easy to manufacture at high accuracy.

Other objects, advantages and novel features of the present invention will become apparent from the following detailed description of the invention when considered in conjunction with the accompanying drawings.

DESCRIPTION OF THE PREFERRED EMBODIMENTS

Figure 1:
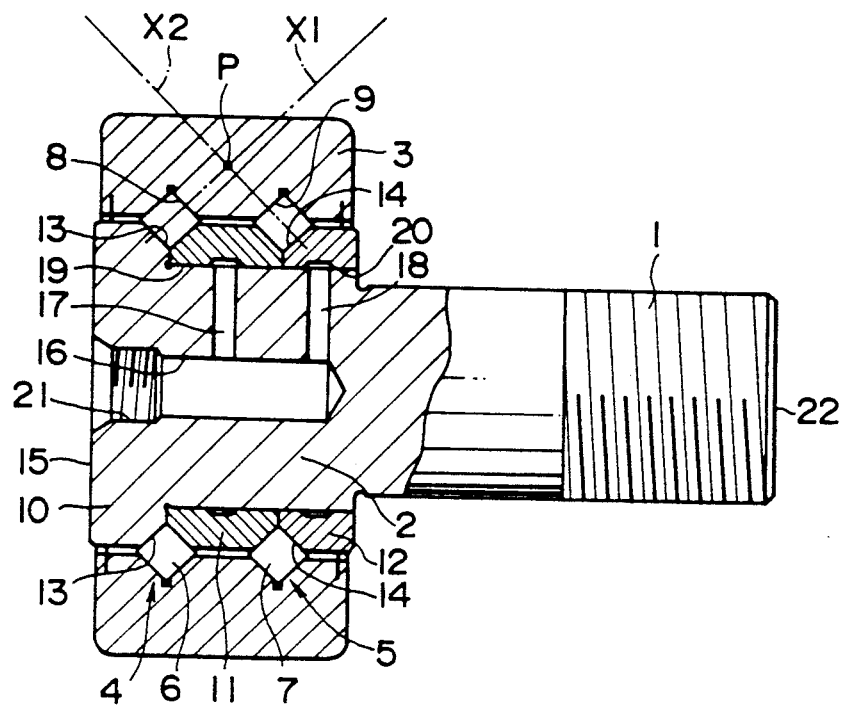
FIG. 1 is a schematic illustration showing in longitudinal cross section a stud type track roller bearing constructed in accordance with one embodiment of the present invention.

Referring now to FIG. 1, there is schematically shown a stud type track roller bearing constructed in accordance with one embodiment of the present invention. As shown, the present bearing includes a stud 1 which is generally elongated in shape and includes a stud head portion which includes an inner ring portion 2 and a flange 10 at the left-most end thereof. The stud 1 also includes a threaded portion 22 at the opposite end, which is connected to the inner ring portion 2 through an intermediate cylindrical shaft portion. The inner ring portion 2 is somewhat larger in diameter than the intermediate shaft portion. The flange 10 has an inclined surface 13 which in the present embodiment defines a rolling surface as will be described more in detail later.

An intermediate ring 11 is fitted onto the inner ring portion 2 in an abutment relation with the flange 10. Preferably, the intermediate ring 11 has an outer diameter which is substantially the same as the outer diameter of the flange 10. The intermediate ring 11 may have any desired inner diameter in relation to the outer diameter of the inner ring portion 10, and, for example, the intermediate ring 11 may be fitted onto the inner ring portion 10 by transitional fit. The intermediate ring 11 has a pair of oppositely inclined surfaces and a flat outer peripheral surface between these oppositely inclined surfaces. Each of these inclined surfaces define a part of an inner guide groove. That is, the left-hand side inclined surface of the intermediate ring 11 and the inclined surface 13 of the flange 10 together define a generally V-shaped first inner guide groove.

A side ring 12 is also fitted onto the inner ring portion 10 of the stud 1 in an abutment relation with the intermediate ring 11. The side ring 12 also has an inclined surface 14 which in the present embodiment also serves as a rolling surface. The inclined surface 14 of the side ring 12 and the adjacent inclined surface of the intermediate ring 11 together defines a second inner guide groove which is generally in the shape of V. Thus, the flange 10, intermediate ring 11 and side ring 12 together define a pair of first and second inner guide grooves spaced apart from each other along the longitudinal axis of the stud 1. The side ring 12 is preferably fitted onto the inner ring portion 10 by thermal interference fit. The side ring 12 also has a flat circumferential outer surface which is preferably substantially same in diameter as the flange 10 and the intermediate ring 11.

The stud 1 is formed with a passage including an axial passage section 16, which is opened at one end at a head end surface 15 of the stud 1 and which is closed at the opposite end, and a pair of radial passage sections 17 and 18, which are in communication with the axial passage section 16 at one end and opened at first and second surface sections 19 and 20, where the intermediate and side rings 11 and 12 are to be located, respectively, at an outer peripheral surface of the inner ring portion 10. The axial passage section 16 is provided with a threaded mouth portion 21.

As shown in FIG. 1, the present bearing also includes an outer ring 3 which has an outer peripheral surface and an inner peripheral surface somewhat larger than the outer diameter of the flange 10, intermediate ring 11 and side ring 12. The inner peripheral surface of the outer ring 3 is formed with a pair of first and second outer guide grooves generally in the shape of V and spaced apart from each other in the longitudinal direction. In the present embodiment, the first outer guide groove includes a first outer rolling surface 8 located opposite to the first inner rolling surface 13 when assembled, and the second outer guide groove includes a second outer rolling surface 9 located opposite to the second inner rolling surface 14 when assembled. Thus, when the outer ring 3 is located in position, there is defined a pair of first and second annular guide channels 4 and 5 spaced apart from each other in the longitudinal axis of the stud 1.

A plurality of cylindrical rollers 6 are provided in the first annular guide channel 4 and also a plurality of cylindrical rollers 7 are provided in the second annular guide channel 5. In this case, since the first guide channel 4 includes a pair of opposed outer and inner rolling surfaces 8 and 13, the rollers 6 are arranged in the first guide channel 4 such that the cylindrical surfaces of these rollers 6 are in rolling contact with these rolling surfaces 8 and 13. Similarly, since the second guide channel 5 include a pair of opposed outer and inner rolling surfaces 9 and 14, the rollers 7 are arranged in the second guide channel 5 such that the cylindrical surfaces of these rollers 7 are in rolling contact with these rolling surfaces 9 and 14.

In this manner, in accordance with the present invention, a rolling contact is provided between the stud 1 and the outer ring 3 at two different axial locations. In FIG. 1, a hypothetical line normal to the rolling surfaces 8 and 13 at the center thereof is indicated by X1 and a similar line normal to the rolling surfaces 9 and 14 is indicated by X2. A merge point between these lines X1 and X2 is located outside of a pitch circle defined by the rollers 6 and 7.

In manufacture, the outer ring 3 may be fabricated as well known in the art. That is, the ring 3 may be fabricated by first cutting a pair of outer guide grooves and then finishing the rolling surfaces 8 and 9 by grinding.

On the other hand, in fabricating a stud subassembly, the intermediate ring 11 is fitted onto the inner ring portion 2 until it comes into abutment against the flange 10 and then the side ring 12 is fitted onto the inner ring portion 2 until it comes into abutment against the intermediate ring 11 by means of thermal interference fit. Thereafter, the rolling surfaces 13 and 14 are ground to a desired finish level. Upon completion of this grinding, an oil injection pump is connected to the axial passage section 16 and then oil under high pressure is applied to the passage sections 16, 17 and 18 to thereby remove the intermediate and side rings 11 and 13 from the inner ring portion 2.

Then, the outer ring 3 is located in position and the rollers 6 are inserted, followed by a step of fitting the intermediate ring 11 onto the inner ring portion 2. Then, the rollers 7 are inserted and finally the side ring 12 is tightly fitted onto the inner ring portion 2 by means of thermal interference fit. It is to be noted that the passage section 17 may be deleted depending on the selected manner of fitting between the intermediate ring 11 and the inner ring portion 2. It should also be noted that these passage sections 16, 17 and 18 may be used as a part of lubricant distributing system, if desired.

Figure 2:
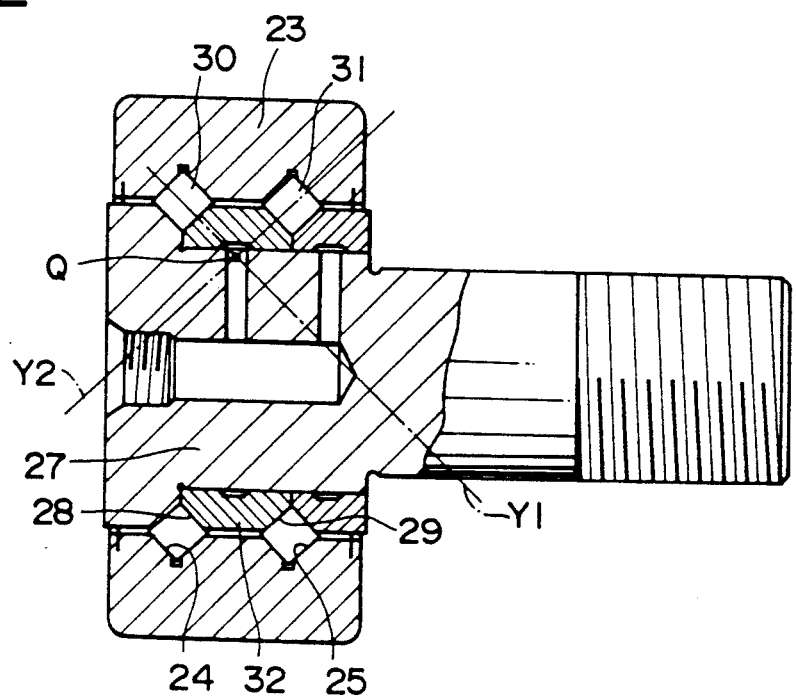
FIG. 2 is a schematic illustration showing in longitudinal cross section a stud type track roller bearing constructed in accordance with another embodiment of the present invention.
Figure 3:
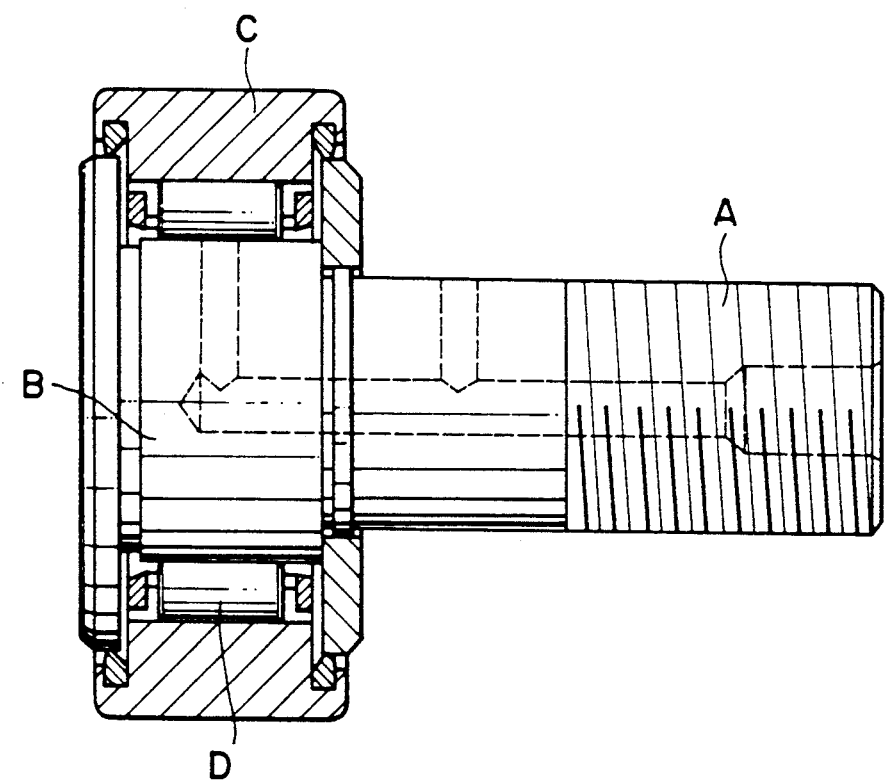
FIG. 3 is a schematic illustration showing in longitudinal cross section a typical prior art stud type track roller bearing.

FIG. 2 illustrates a second embodiment of the present invention which is similar in many respects to the first embodiment shown in FIG. 1 and described above so that only those elements which need to be explained are assigned with reference numerals.

The present embodiment differs from the first embodiment only in the location where the rolling surfaces are provided. That is, in the present embodiment shown in FIG. 2, an intermediate ring 32 is formed with a pair of inclined surfaces which define first and second inner rolling surfaces 28 and 29, respectively, as different from the first and second inner rolling surfaces 13 and 14 which are defined by the inclined surfaces of the flange 10 and the side ring 12 in the first embodiment. Therefore, the outer ring 23 is formed with a pair of first and second outer guide grooves which are formed with first and second outer rolling surfaces 24 and 25 in an opposed relationship with the first and second inner rolling surfaces 28 and 29, respectively. As a result, there is provided a pair of first and second guide channels which are provided with a plurality of rollers 30 and 31, respectively.

In the second embodiment, a pair of normal lines Y1 and Y2 passing through the centers of the first and second rolling surfaces 24-28 and 25-29, respectively, define a merge point Q which is located inside of a pitch circle defined by the rollers 30 and 31, as indicated in FIG. 2. As a result, the second embodiment shown in FIG. 2 is less effective in sustaining moment loads as compared with the first embodiment shown in FIG. 1.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A stud type track roller bearing comprising:
   a stud generally elongated in shape and having an inner ring portion at one end portion thereof;
   defining means fixedly mounted on said stud located at said inner ring portion for defining a pair of circumferential inner guide grooves spaced apart from each other in a direction parallel to a longitudinal axis of said stud;

an outer ring formed with a pair of circumferential outer guide grooves spaced apart from each other at an inner peripheral surface thereof and fitted onto said stud such that each of said circumferential outer guide grooves is aligned with a corresponding one of said circumferential inner guide grooves to thereby define a pair of annular guide channels; and a plurality of rollers provided in each of said pair of annular guide channels.

2. The bearing of claim 1, wherein said defining means includes a flange having an inclined surface and formed at an outer end of said inner ring portion, a first ring having a pair of first and second oppositely inclined surfaces and fitted onto said inner ring portion in an abutment relationship with said flange and a second ring having an inclined surface and fitted onto said inner ring portion in an abutment relationship with said first ring, whereby a first inner guide groove is defined by said inclined surface of said flange and one of said first and second oppositely inclined surfaces of said first ring which is located adjacent to said inclined surface of said flange and a second inner guide groove is defined by the remaining one of said first and second oppositely inclined surfaces of said first ring and said inclined surface of said second ring.

3. The bearing of claim 2, wherein each of said first and second inner guide grooves is generally in the shape of V.

4. The bearing of claim 2, wherein each of said pair of outer guide grooves of said outer ring is also defined by a pair of inclined surfaces, each of which is located opposite to and in parallel with a corresponding one of said inclined surfaces of each of said pair of first and second inner guide grooves.

5. The bearing of claim 4, wherein said inclined surface of said flange and a corresponding inclined surface of said outer ring are defined as associated rolling surfaces along which said rollers in one of said pair of annular guide channels roll and said inclined surface of said second ring and a corresponding inclined surface of said outer ring are defined as associated rolling surfaces along which said rollers in the remaining one of said pair of annular guide channels roll.

6. The bearing of claim 5, wherein said rolling surfaces are ground surfaces.

7. The bearing of claim 2, wherein said second ring is fitted on said inner ring portion by an interference fit.

8. The bearing of claim 7, wherein said stud is formed with an internal passage leading from a first opening provided at an end surface thereof to a second opening provided at a peripheral surface of said inner ring portion of said stud at a location where said second ring is to be fitted thereon.

* * * * *